G. SANFORD.
Hemp and Flax Brake
No. 205,910.  Patented July 9, 1878.
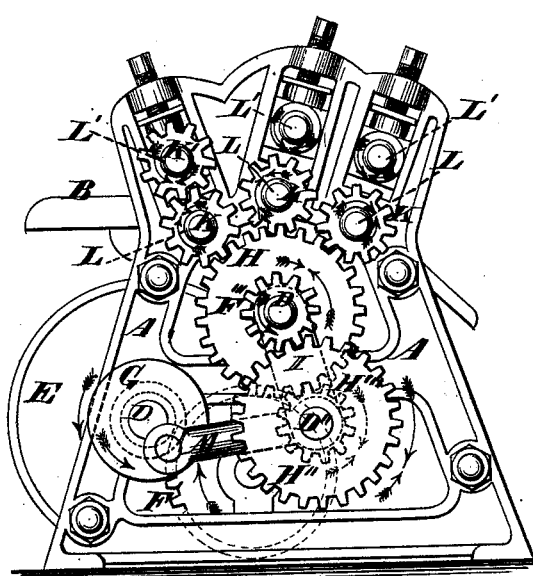
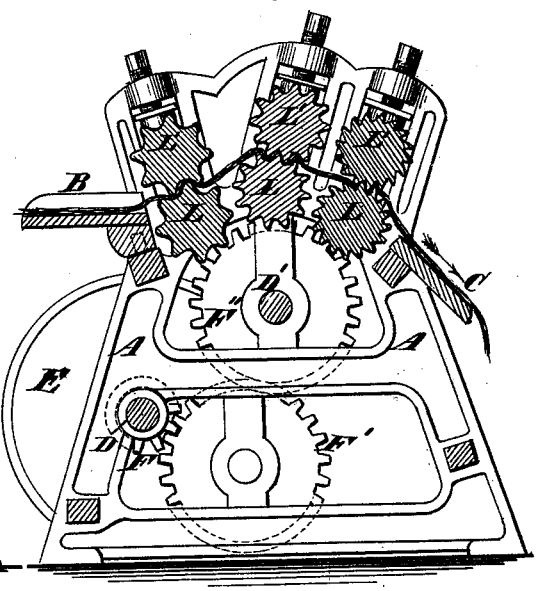
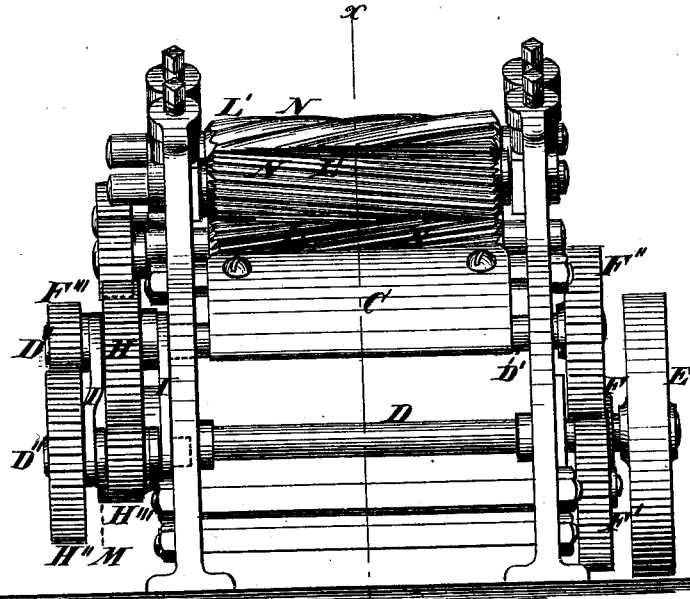

UNITED STATES PATENT OFFICE.

GELSTON SANFORD, OF BROOKLYN, ASSIGNOR TO MALLORY & SANFORD AMERICAN AND FOREIGN FLAX AND HEMP DRESSING MACHINE COMPANY, OF NEW YORK, N. Y.

IMPROVEMENT IN HEMP AND FLAX BRAKES.

Specification forming part of Letters Patent No. 205,910, dated July 9, 1878; application filed May 14, 1878.

*To all whom it may concern:*

Be it known that I, GELSTON SANFORD, of Brooklyn, in the county of Kings and State of New York, have invented an Improvement in Machines for Braking and Cleaning Flax, Hemp, and other like Fiber-Yielding Plants; and I do hereby declare that the following is a full, clear, and exact description of the same, reference being had to the accompanying drawing, forming a part of this specification.

This invention is an improvement upon inventions for which Letters Patent were granted to me, respectively, on the 16th of September, 1862, and April 28, 1863, the said patents being numbered, respectively, 36,485 and 38,340.

In my former machine, referred to, the braking was performed by braking-rollers, which had thereon intermeshing flutes, formed parallel to the axes of the shafts of said rollers or the bearings of the said rollers. The said rollers were arranged in pairs, and one of each pair was driven by a gear deriving its motion, through suitable intermediate mechanism, from the main driving-shaft of the machine, while the other roller in the same pair was driven by the action of the intermeshing flutes. The said rollers were driven in a reciprocating manner—that is to say, they were rotated backward and forward, but in such manner that their forward motion was somewhat greater than the backward motion, and therefore, after a certain number of oscillations, they would make a complete revolution. The said rollers were, moreover, when more than one pair were used, so arranged that the material from one pair would, after being acted upon by the said pair, pass onto and be acted upon by another pair of somewhat finer flutes, and so on, the rollers being graduated in fineness till the complete dressing of the material was accomplished. The said rollers exerted both a braking and a rubbing action upon the stalks and leaves of the plant from which it was desired to separate the fiber; and it is one of the objects of the present invention to increase the said rubbing of the said rollers without diminishing their braking action on the stalks and leaves of the plant to be treated.

In the machine as constructed under the first of my above-cited former patents, the devices employed to produce the reciprocating rotation of the braking-rollers had certain defects, which I endeavored to remove by the devices employed in the invention for which the latter of the two aforementioned patents was granted to me; but the said invention, although a marked improvement on the earlier invention, still had a defect that will subsequently be pointed out, and which it is one of the objects of my present invention to remove.

In the machine as constructed under the aforementioned patents, the braking-rollers were arranged in pairs, and, as aforesaid, one of the rollers in each pair was driven by the intermeshing of the flutes in said rollers. I have found by experience that this is not the best way to actuate the said rollers; and it is a further object of the present invention to provide a way for driving the said rollers in which the flutes on the said rollers will be less liable to injury than in the method heretofore employed, as will be hereinafter explained.

To secure these ends, my invention consists, partly, in braking-rollers having formed thereon spiral mutually-intermeshing flutes, by which construction I am enabled to obtain an increased rubbing action of the said rollers without decreasing their braking action.

The invention also consists in improved means for driving the said rollers in the reciprocating rotary manner above described.

The invention consists, further, in the combination, with the fluted braking-rollers, of gears which intermesh to drive the said rollers in unison with each other without employing the flutes on the said rollers for driving one of each pair of said rollers by its fellow, the said gears being arranged in relation with the said flutes to secure the intermeshing of said flutes, as hereinafter described.

Figure 1 in the drawing is an end view of a machine constructed in accordance with my invention. Fig. 2 is a section on the line $x\ x$ in Fig. 3. Fig. 3 is a view of that side of the machine from which the material is delivered after the braking and cleaning have been performed.

A represents the frame which supports the working parts of the machine, the feed-table B, and a discharge chute or apron, C. D is the main driving-shaft, to which power is imparted to rotate the same through a pulley, E, the direction of the rotation being indicated by the arrow in Fig. 1. On the said shaft D, near the pulley E, is a spur-gear, F, which meshes into another gear, F'. The latter is merely a transmitter of rotary motion from the gear F to another gear, F'', attached to a shaft, D'. By the said shafts D and D' rotary motion is transmitted to the gearing hereinafter described, and located on the side of the machine opposite the pulley E.

To the end of the shaft D, opposite the pulley E, is attached a crank-wheel, G, Fig. 1. To the end of the shaft D', opposite the gear-wheel F'', is attached a smaller gear-wheel, F'''. Fitted to turn upon the said shaft D', but not intended to turn with the said shaft, is a gear, H, through which rotary motion is imparted to the gears K attached to the braking-rollers L, hereinafter described.

From the shaft D' is suspended an arm or arms, I, arranged to oscillate on a bearing or bearings on the said shaft, as hereinafter described. I prefer to use two of the said arms, having at their lower ends bearings for the shaft D'', to which shaft are attached a gear, H'', and a pinion, H'''.

The gear H'' intermeshes with the gear-wheel F'''. The pinion H''' intermeshes with the transmitting-gear H, which in turn intermeshes with the spur-gears K attached to the bottom braking-rollers L, as before stated.

The bearings of the shaft D'' are connected with the crank-wheel G by the connecting-rod M, which arrangement causes the said bearings to oscillate about the center of the shaft D' when the shaft D is rotated, as hereinbefore described. At the same time the rotary motion of the shaft D is communicated to the said shaft D' by means of the hereinbefore-described gearing intermediate between the said shafts.

The result of this combination of parts is that, when the arms I are oscillated toward that side of the machine presented to the front in Fig. 3, the transmitting-gear H is caused to rotate on its axis through an angular distance equal to that due to the rotation on its center of the gear H''', plus the angular distance of rotation derived from the oscillation of the said arms. On the contrary, when the said arms are moved in the opposite direction the said gear H is caused to rotate through an angular distance equal to that due to the oscillation of the said arms on the center of the shaft D', minus that due to the rotation on its center of the gear H'''; but in this case the direction of the rotation of the said gear H is the reverse of that obtained by the first-named movement of the arms I. This mode of driving the rollers K K', as compared with that described in my Letters Patent No. 38,340, above referred to, and dated April 28, 1863, secures the following advantages over the said former method: It enables as long a connecting-rod, M, as desirable to be employed without compelling increase in the size and weight of the large swinging gear H''; and with a longer rod I am enabled to use a longer crank on the crank-wheel G, and thus to increase the oscillating or reciprocating rotary movement of the braking-rollers beyond what was possible in the former machine without reducing the speed of the same on account of the great momentum of the oscillating gearing. The effectiveness of the machine is therefore largely increased by this feature of my present invention.

As the said gear H meshes into the gears K on the lower braking-rollers L, it follows that the oscillating rotation of the said gear H will be imparted to the said rollers, and the said braking-rollers therefore have a forward and backward rotation at each oscillation of the arms I; but the forward motion, or that toward the discharge side of the machine, is the greater, so that after the material has been broken and rubbed sufficiently between the said rollers to complete the separation of the fiber from the refuse portions, the separated fiber will be delivered from the said rollers on the chute or apron C, whence it may be taken for market or for further manipulations in the process of its manufacture.

As before stated, the said rollers are arranged in one or more pairs. The upper rollers are lettered L'. Both the upper and lower rollers are formed with spiral flutes N, which intermesh with each other. In at least one pair of the said rollers (the first and coarsest of the said pairs) I prefer not to rely on the intermeshing of the said flutes for driving one of the rollers by the other. With rollers that do not oscillate in their rotation the flutes may be used to drive one of the rollers without so much danger of injury to the said flutes; but with rollers constructed and operating, as herein described, with an oscillating rotation, this is apt to break off the said flutes. I obviate this difficulty and secure a much greater durability of the said rollers by driving one of the pairs of fluted rollers by gears K K' attached to the said rollers, as shown in Fig. 1. The lower of the said gears K derives motion from the gear H, as hereinbefore specified, and transmits its motion to the upper gear K'. The said gears are, moreover, arranged in such relation with the flutes N on the said rollers that the said flutes are caused to intermesh midwise between each other. This prevents their ever failing to intermesh properly through the action of intervening material, the pressure of which between the said rollers sometimes acts to spread or spring them apart, and to cause the flutes on the same to interfere instead of intermeshing properly when one of the said rollers is driven by the intermeshing of the said flutes. It also prevents the play of the flutes of one roller in the grooves of the other and the clashing of the flutes, which is liable to break them.

Although I have said that I prefer to use the gears as described on the rollers having flutes of the coarser pitch, I do not limit this use to the said coarse-pitched rollers; but I may use the said method and means for driving one of each of the pairs of rollers in the manner described.

The flutes on the said braking-rollers are spiral, as shown at N in Fig. 3. By this construction I am enabled to increase the rubbing action of the said flutes upon the material to be treated, which tends to free the said material more rapidly and effectively from the woody and refuse portions; and as the mutually-intermeshing flutes come into mesh more gradually the machine can be run much faster with less power, and with less liability to break the flutes than when the said flutes are made straight and parallel to the axes of the rollers. Their comminuting action upon the woody portions of the plant stalks or leaves is also increased, as they act obliquely to the said stalks or leaves, instead of at right angles with the length of said stalks and leaves, as heretofore.

I claim—

1. The combination, with the shaft D and the shaft D', rotated by intermediate gearing from the shaft D, of the gear or gears K attached to the brake roller or rollers L, the transmitting-gear turning on the shaft D', the pinion F''' attached to the shaft D', the oscillating arm or arms I, having bearings on the shaft D', shaft D'' having a bearing or bearings in the said arm or arms, the gear H''', intermeshing with the gear H and attached to the shaft D'', the gear H'' attached to the shaft D'' and intermeshing with the pinion F''', the crank-wheel G attached to the shaft D, and the connecting-rod M, all constructed and operating substantially as and for the purpose set forth.

2. The combination, with the braking-rollers having an oscillating or reciprocating rotary motion, substantially as described, of the gears K K', attached to the said rollers in relation with the flutes on the said rollers, to cause the said flutes to intermesh midwise between each other, substantially as and for the purpose set forth.

3. The backward and forward rotating or reciprocating braking-rollers L L', having on their surfaces the spirally-intermeshing flutes for increasing the rubbing action of the flutes of the said rollers upon the material from which the fiber is to be separated, substantially as and for the purpose set forth.

GELSTON SANFORD.

Witnesses:
 T. J. KEANE,
 ALFRED BURHORN.